United States Patent
Eastman

(10) Patent No.: US 12,301,603 B1
(45) Date of Patent: May 13, 2025

(54) MIRRORING TRAFFIC IN A SERVICE MESH TO DETECT AND BLOCK OFFENDING MICROSERVICES

(71) Applicant: Rapid7, Inc., Boston, MA (US)

(72) Inventor: Carl Eastman, Round Rock, TX (US)

(73) Assignee: Rapid7, Inc., Boston, MA (US)

(*) Notice: Subject to any disclaimer, the term of this patent is extended or adjusted under 35 U.S.C. 154(b) by 282 days.

(21) Appl. No.: 18/107,107

(22) Filed: Feb. 8, 2023

(51) Int. Cl.
    H04L 29/06 (2006.01)
    H04L 9/40 (2022.01)

(52) U.S. Cl.
    CPC ...... H04L 63/1425 (2013.01); H04L 63/0823 (2013.01); H04L 63/1433 (2013.01); H04L 63/1466 (2013.01)

(58) Field of Classification Search
    CPC ............ H04L 63/1425; H04L 63/0823; H04L 63/1433; H04L 63/1466
    See application file for complete search history.

(56) References Cited

U.S. PATENT DOCUMENTS

| | | | |
|---|---|---|---|
| 10,284,574 B1 | 5/2019 | Aziz et al. | |
| 10,764,244 B1 | 9/2020 | Mestery et al. | |
| 10,805,213 B2 | 10/2020 | Pilkington et al. | |
| 11,032,160 B1 | 6/2021 | Raheja | |
| 2016/0261611 A1* | 9/2016 | Heilig | H04L 63/1425 |
| 2016/0269425 A1* | 9/2016 | Shieh | H04L 63/0254 |
| 2021/0019194 A1 | 1/2021 | Bahl et al. | |
| 2021/0058424 A1* | 2/2021 | Chang | G06F 11/3409 |
| 2022/0007192 A1* | 1/2022 | Shaw | H04L 63/0209 |
| 2023/0007024 A1* | 1/2023 | Maria Vega | H04L 63/1441 |

OTHER PUBLICATIONS

Jacob, Stephen, Yuansong Qiao, and Brian Lee. "Detecting Cyber Security Attacks against a Microservices Application using Distributed Tracing." ICISSP. 2021. (Year: 2021).*

* cited by examiner

*Primary Examiner* — Ka Shan Choy

(74) *Attorney, Agent, or Firm* — Ashwin Anand

(57) ABSTRACT

In some examples, a server identifies a first and second microservice. The server creates a first mirror to mirror first traffic sent to the first microservice and a second mirror to mirror second traffic sent to the second microservice. The server configures the first and second mirror service to create mirrored traffic out-of-band of a critical request path of the first and second microservice. The server configures the first and second mirror service to modify a header of a mirrored request to indicate: the mirrored request is a mirrored copy of a request, an original source of the request, and an original destination of the request. The server configures the first and second mirror service to send the mirrored traffic to a traffic analyzer that uses artificial intelligence, automated vulnerability scans, or both to identify an anomalous behavior of an offending microservice in the cluster.

20 Claims, 8 Drawing Sheets

300

```
apiVersion: networking.istio.io/v1alpha3
kind: VirtualService
metadata:
    name: Service_A
spec:
    hosts:
    - Service_A
    http:
    - route:
        - destination:
            host: Service_A
            weight: 100
        mirror:
            host: Traffic_Analyzer
        mirrorPercentage:
            value: 100.0
```

```
apiVersion: networking.istio.io/v1beta1
kind: Sidecar
metadata:
    name: Service_A
    namespace: apps
spec:
    egress:
    - hosts:
    - ./23479873241234791234.apps.svc.cluster.local
    outboundTrafficPolicy:
        mode: REGISTRY_ONLY
    workloadSelector:
        labels:
            app: Service_A
```

FIG. 4

MIRRORING TRAFFIC IN A SERVICE MESH TO DETECT AND BLOCK OFFENDING MICROSERVICES

BACKGROUND

Many companies operate private computer networks that are connected to public networks such as the Internet. While such connections allow company users to easily access resources on the public networks, they also create vulnerabilities in the company network. For example, company users may unwittingly download malicious content (e.g., data, files, applications, programs, etc.) onto the company network from untrusted sources on the Internet. As another example, interactions of company users with the public network may provide opportunities for malicious actors to attack the company network. A malicious actor can plant spyware, viruses, or other types of malicious software in a company's private network though a variety of interactive means, in order to steal sensitive information from the company or even gain control of the company's computing systems. As a result, enterprise security systems have become increasingly important to protect company networks against these types of vulnerabilities.

Modern software systems are often architected as distributed clusters of microservices, with each microservice performing a specific (e.g., discrete) function. In some cases, each microservice may be implemented as a container that packages a software application, an operating system, and additional code, such as system libraries and dependencies used by the application, into a single lightweight executable. As the deployment of distributed services grows in size and complexity, a system that includes multiple clusters can become difficult to understand, secure, and manage.

One issue with such a system is that traffic within a cluster of microservices is not monitored. Typically, each microservice within a cluster can communicate with other microservices in the cluster without any restriction, making the cluster vulnerable to attack from within the cluster itself either by design (e.g., a microservice is designed as a bad actor) or due to a bug in the microservice that causes the microservice to unintentionally create problems (e.g., by flooding other microservices with messages or the like).

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server determines a plurality of microservices, including at least a first microservice and a second microservice, in a cluster. The server creates a first mirror service to mirror first traffic sent to the first microservice and creates a second mirror service to mirror second traffic sent to the second microservice. The server configures the first mirror service and the second mirror service to create, based on the first traffic and the second traffic, mirrored traffic that is created out-of-band of a critical request path of the first microservice and of the second microservice, respectively. The server configures the first mirror service and the second mirror service to modify a header of a mirrored request in the mirrored traffic to indicate: (i) that the mirrored request in the mirrored traffic is a mirrored copy of a request, (ii) an original source of the request, and (iii) an original destination of the request. The server configures the first mirror service and the second mirror service to send the mirrored traffic to a traffic analyzer to perform an analysis of the mirrored traffic to identify an anomalous behavior of an offending microservice operating in the cluster. The traffic analyzer uses an artificial intelligence algorithm, automated vulnerability scans, or both to perform the analysis.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 3 is an example of code to mirror traffic being sent to a microservice, according to some embodiments.

FIG. 4 is an example of code to create a sandbox around a microservice by blocking traffic being sent by the microservice to other microservices, according to some embodiments.

DETAILED DESCRIPTION

Figure 1:
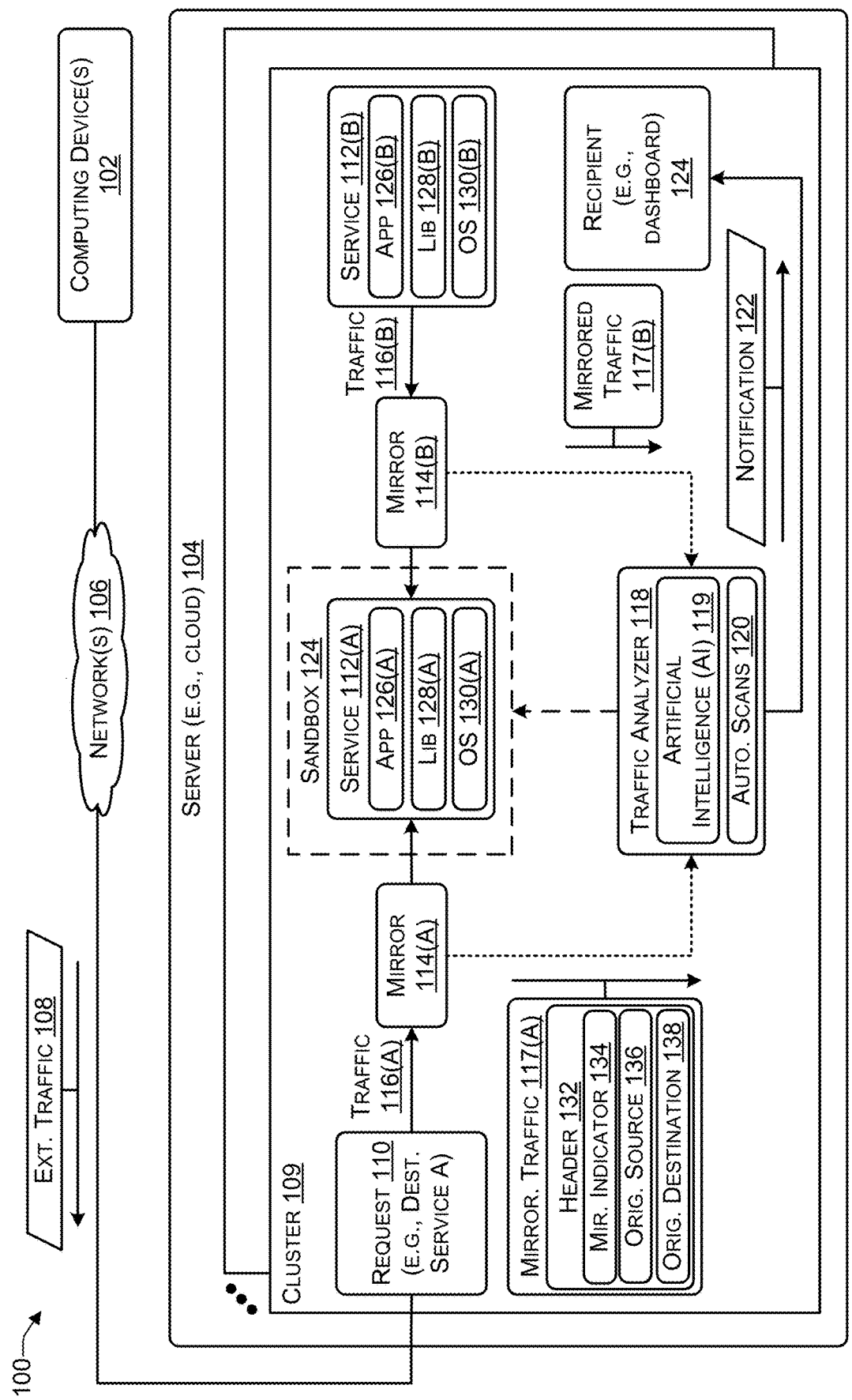
FIG. 1 is a block diagram of a system that includes a traffic analyzer to analyze mirrored traffic associated with microservices in a cluster, according to some embodiments.

A container is a package that includes an application (e.g., software code) along with the operating system (OS) libraries and dependencies used by the application. The container is a single, lightweight, executable that can run consistently on any infrastructure. Kubernetes is an example of a portable, extensible, open-source platform for managing containerized workloads and services. In a microservice architecture, an application may be configured using a collection of services (also referred to as microservices). Each service is maintainable, testable, independently deployable, and organized around a particular set of capabilities. Each service may be implemented as a container, e.g., in a Kubernetes environment.

The microservice architecture enables rapid and reliable delivery of large, complex applications. Modern applications are typically architected as distributed collections, known as clusters, of microservices, with each cluster performing a particular business function. A service mesh is an infrastructure layer that is used by microservices in each cluster. The service mesh provides capabilities, such as discovery, load balancing, failure recovery, metrics, traffic management, security, and the like. The microservices in a cluster are not modified to implement these capabilities because these capabilities are provided by the service mesh. The term "service mesh" refers to both the type of software used to implement the service mesh and to the network domain created when using the software. As the deployment of distributed clusters of microservices in a Kubernetes-based system grows in size and complexity, such a system becomes harder to (i) understand, (ii) secure, and (iii) manage. A major issue is that traffic within a Kubernetes cluster is not monitored, enabling microservices within the cluster to communicate with each other without restriction. For example, a microservice that has a bug may unintentionally cause problems. For example, the bug may cause the microservice to send messages and/or request data, thereby flooding the cluster with traffic. As another example, a microservice designed as a bad actor may infiltrate a cluster and, when triggered, generate excessive traffic, access and expose sensitive data, and the like.

The systems and techniques described herein mirror (e.g., create a copy of) traffic between microservices (e.g., within a cluster), analyze (e.g., using artificial intelligence and/or automated scans) the mirrored traffic, and perform one or more actions in response to detecting anomalous (e.g., unusual or suspicious) behavior. For example, the actions may include automatically (without human interaction) sandboxing the offending microservice (that is exhibiting anomalous behavior) by blocking all outgoing (egress) traffic originated by the offending microservice.

The systems and techniques create a mirror for traffic that each microservice receives. Up to 100% of the traffic may be mirrored. A traffic analyzer receives the mirrored traffic associated with each of the microservices in the cluster and performs an analysis of the mirrored traffic. For example, an artificial intelligence (AI) may be used to analyze the mirrored traffic to detect anomalous behavior. In some cases, vulnerability detection software, exploit libraries, and the like may be used to analyze the mirrored traffic. After a vulnerability (e.g., anomalous behavior) is detected, the offending microservice that is causing the problem may be blocked ("sandboxed") such that all egress (outgoing) traffic to other microservices in the cluster and to any external endpoints is blocked (e.g., prevented from being sent to the destination).

In conventional architectures, intra-cluster traffic is not analyzed, enabling a microservice exhibiting anomalous behavior to go undetected. Typically, traffic analysis is performed at the incoming edge of the network or, in some cases, at the ingress of a cluster. The systems and techniques described herein detect, address and/or alert when anomalous traffic is detected within the cluster itself. Unwanted (anomalous) behavior may be introduced into the cluster in several different ways. As a first example, an external bad actor may introduce malicious code in a library that is used by a microservice in a cluster. As a second example, an employee may introduce malicious code that is used by a microservice in a cluster. As a third example, a poorly written application may execute malicious code that has been uploaded. As a fourth example, a compromised 3rd party application may be deployed in the cluster. Note that the term malicious code refers to any code that causes an unwanted issue, such as generating excessive traffic, exposing confidential data, or the like. The malicious code may be deliberately introduced into a cluster or may be unintentionally or inadvertently introduced into the cluster (e.g., due to a coding error).

The systems and techniques described herein use in-cluster traffic mirroring to mirror traffic being sent to each service. A proxy service, such as Envoy proxy service (a container in Kubernetes), may be used to mirror traffic. To illustrate, Envoy's RequestMirrorPolicy may be exposed to Istio via the Istio virtual service custom resource mirror configuration. Istio is a service mesh that provides a service networking layer to automate application network functions. The mirrored traffic occurs in-band but out-of-band of the critical request path of each service. The critical request path is modified slightly due to the introduction of the Istio-proxy container. The Istio-proxy container is configured as a mirror and therefore intercepts all incoming and outgoing network transmission control protocol (TCP) traffic. Because the Istio-proxy container is configured as a mirror to intercept all traffic coming into and out of each service, the mirroring occurs in-band (but out-of-band of a critical request path) for each service. The mirrored traffic is sent to a traffic analyzer that does not respond to the requests. The requests in the mirrored traffic are mirrored as "fire and forget", such that any responses to the requests are discarded. The traffic analyzer that receives the mirrored traffic may use AI and/or scan the traffic using vulnerability scanning libraries to detect anomalous behavior, such as, for example, structured query language (SQL) injection, cookie poisoning, cross-site scripting, and the like. SQL injection is the placement of malicious code in SQL statements (e.g., via web page input). Cookie poisoning (also known as session hijacking) involves altering, forging, hijacking, or performing another type of "poisoning" of a valid cookie that is sent back to a server to steal data, bypass security, or both. Cross-Site Scripting (XSS) injects a malicious script into a trusted website. XSS occurs when an attacker uses a web application to send malicious code (e.g., in the form of a browser side script) to a different end user. For example, an attacker may use XSS to send a malicious script to an unsuspecting user. The user's browser has no way of knowing that the script should not be trusted, and therefore the browser executes the script. Because the browser thinks the script came from a trusted source, the malicious script can access cookies, session tokens, or other sensitive information retained by the browser and used with that site.

The Host/Authority header of a request in the mirrored traffic is modified (e.g., to append "shadow" or another word) to indicate to the traffic analyzer that the traffic being sent is mirrored traffic. The header of a request in the mirrored traffic is modified to indicate the original originating (source) service and the original destination of the request. After the traffic analyzer detects a vulnerability (e.g., anomalous behavior), the traffic analyzer may perform one or more actions, such as is sandboxing the offending microservice by blocking outgoing (e.g., egress) traffic (e.g., using Istio's sidecar custom resource), notifying an administrator, or the like.

As a first example, a server includes one or more processors and one or more non-transitory computer readable media storing instructions executable by the one or more processors to perform various operations. The operations include determining a plurality of microservices, comprising at least a first microservice and a second microservice, that are in a cluster. In some cases, the first microservice and the second microservice may each use mutual Transport Layer Security (mTLS) to establish an encrypted transport layer security connection. For example, the first microservice may use a first digital certificate to authenticate the second microservice, and the second microservice may use a second digital certificate to authenticate the first microservice. The operations include creating a first mirror service to mirror first traffic sent to the first microservice and creating a second mirror service to mirror second traffic sent to the second microservice. For example, a first proxy in a data plane of the cluster may be configured as a mirror to create the first mirror service and a second proxy in the data plane of the cluster may be configured as a mirror to create the second mirror service. The operations include configuring the first mirror service and the second mirror service to create, based on the first traffic and the second traffic, mirrored traffic that is created out-of-band of a critical request path of the first microservice and of the second microservice. The operations include configuring the first mirror service and the second mirror service to modify a header of a mirrored request in the mirrored traffic to indicate (i) that the mirrored request in the mirrored traffic is a mirrored copy of a request, (ii) an original source of the request, and (iii) an original destination of the request. The operations include configuring the first mirror service and the second mirror service to send the mirrored traffic to a traffic analyzer. The operations may include configuring the first mirror service and the second mirror service to mirror a request included in either the first traffic or the second traffic as a type of request (e.g., "fire and forget") to indicate to the traffic analyzer to not respond to the request. The traffic analyzer performs an analysis of the mirrored traffic to identify an anomalous behavior of an offending microservice operating in the cluster. The traffic analyzer uses an artificial intelligence (AI) algorithm, automated vulnerability scans, or both to perform the analysis. After identifying the anomalous behavior of the offending microservice, the operations may include blocking outgoing traffic originating from the offending microservice, sending a notification indicating that the offending microservice is exhibiting anomalous behavior, or any combination thereof. For example, the artificial intelligence algorithm may comprise one of: a support vector machine, an unsupervised clustering algorithm, or an artificial neural network algorithm. The artificial intelligence algorithm may be trained using: (i) a plurality of vulnerabilities, and (ii) one or more attributes associated with individual vulnerabilities of plurality of vulnerabilities.

As a second example, a server may include one or more processors and one or more non-transitory computer readable media storing instructions executable by the one or more processors to perform various operations. The operations include determining a plurality of microservices comprising at least a first microservice and a second microservice that are in a cluster. The operations may include establishing an encrypted transport layer security connection in which: the first microservice uses a first digital certificate to authenticate the second microservice and the second microservice uses a second digital certificate to authenticate the first microservice. The operations include creating a first mirror service to mirror first traffic sent to the first microservice and creating a second mirror service to mirror second traffic sent to the second microservice. For example, a first proxy in a data plane of the cluster may be configured as a mirror to create the first mirror service, and a second proxy in the data plane of the cluster may be configured as a mirror to create the second mirror service. The operations include configuring the first mirror service and the second mirror service to create, based on the first traffic and the second traffic, mirrored traffic is created out-of-band of a critical request path of the first microservice and of the second microservice. The operations include configuring the first mirror service and the second mirror service to modify a header of a mirrored request in the mirrored traffic to indicate: (i) the mirrored request in the mirrored traffic is a mirrored copy of a request, (ii) an original source of the request, and (iii) an original destination of the request. The operations include configuring the first mirror service and the second mirror service to send the mirrored traffic to a traffic analyzer. The operations may include configuring the first mirror service and the second mirror service to mirror a request included in either the first traffic or the second traffic as a type of request (e.g., "fire and forget") to which the traffic analyzer is not to respond or, if the traffic analyzer sends a response, the response is ignored. The traffic analyzer performs an analysis of the mirrored traffic to identify an anomalous behavior of an offending microservice operating in the cluster. The traffic analyzer uses an artificial intelligence (AI) algorithm, automated vulnerability scans, or both to perform the analysis. The operations may include creating a sandbox around the offending microservice to block outgoing traffic after identifying the anomalous behavior of the offending microservice. The operations may include sending a notification message to a recipient indicating that the offending microservice is exhibiting anomalous behavior. For example, the recipient may include a dashboard associated with the cluster, a system administrator, or both. The artificial intelligence algorithm may be one of: a support vector machine, an unsupervised clustering algorithm, or an artificial neural network algorithm. The artificial intelligence algorithm may be trained using: (i) a plurality of vulnerabilities and (ii) one or more attributes associated with individual vulnerabilities of plurality of vulnerabilities.

FIG. 1 is a block diagram of a system 100 that includes a traffic analyzer to analyze mirrored traffic associated with microservices in a cluster, according to some embodiments. The system 100 includes one or more computing devices 102 coupled to a server 104 via one or more networks 106. The computing devices 102 may send external traffic 108, via the network(s) 106, to the server 104. The server 104 may use one or more hardware servers to provide cloud-hosting to at least one cluster, such as a representative cluster 109.

Each cluster, such as the representative cluster 109, may include one or more services (e.g., microservices) 112, such as representative services 112(A) (e.g., first service) and 112(B) (e.g., second service). For ease of illustration, two services (112(A), 112(B)) are shown in cluster 109. However, it should be understood that the cluster 109 may include more than two services. In the example illustrated in FIG. 1, the external traffic 108 may include a request 110 (e.g., a Hypertext Transfer Protocol (HTTP) request or similar) that has service 112(A) as a destination. In some cases, each of the services 112 may be implemented using a container. For example, when implemented as a container, each of the services 112 may include an application ("app") 126, a library ("lib") 128 of code used by the application 126, and an operating system ("OS") 130. To illustrate, the service 112(A) includes application 126(A), library 128(A), and operating system 130(A), and the service 112(B) includes application 126(B), library 128(B), and operating system 130(B).

To identify a service that is exhibiting anomalous behavior, a proxy service may be configured to mirror traffic sent to each of the services 112. For example, the proxy service available in a service mesh, such as Istio, may be configured to perform traffic mirroring. As shown in FIG. 1, a first proxy service may be configured as a mirror 114(A) to mirror traffic sent to service 112(A) and a second proxy service may be configured as mirror 114(B) to mirror traffic sent to service 112(B). Each of the mirrors 114(A), 114(B) send mirrored traffic 117(A), 117(B), respectively, to a traffic analyzer 118. Each of the mirrors 114, such as the mirror 114(A), may modify a header 132 of the mirrored traffic 117(A) to indicate that the content is mirrored by, for example, setting a mirrored indicator 134, to indicate to the traffic analyzer 118 to not respond to the mirrored traffic 117. Each of the mirrors 114 may modify the header 132 of the mirrored traffic 117 to indicate an original source 136 and an original destination 138 of the traffic 116(A). For example, after the request 110 is sent (via traffic 116(A)) to the service 112(A), the mirror 114(A) mirrors the traffic 116(A) to create the mirrored traffic 117(A) and sends the mirrored traffic 117(A) to the traffic analyzer 118. In this example, the original source 136 is the external traffic 108 and the original destination 138 is the service 112(A). The mirrored traffic 117 occurs in-band (however, out-of-band of a critical request path) for each service 112. The critical request path of each service 112 is modified slightly due to the introduction of the mirrors 114 (e.g., Istio-proxy containers). The Istio-proxy containers are configured as the mirrors 114 to intercept all incoming and outgoing network transmission control protocol (TCP) traffic. Because the Istio-proxy containers are configured as the mirrors 114 to intercept all traffic coming into and out of each of the services 112, the mirroring may occur in-band (but out-of-band of a critical request path) for each of the services 112.

After receiving the traffic 116(A) that includes the request 110, the service 112(A) may send a request (via traffic 116(B)) to the service 112(B). The mirror 114(B) mirrors the traffic 116(B) to create mirrored traffic 117(B) and sends the mirrored traffic 117(B) to the traffic analyzer 118. In this way, traffic sent to each service 112 in the cluster 109 is mirrored and sent to the traffic analyzer 118 for analysis. Each of the mirrors 114 may be individually configured to mirror and send a particular percentage of traffic to the traffic analyzer 118. For example, in some cases, the mirrors 114 may be configured to mirror 100% of the traffic sent to each of the services 112. In other cases, the mirrors 114 may be configured to mirror less than 100% of the traffic sent to each of the services 112. The percentage of traffic that is mirrored may depend on the number of services in the cluster 109 and the capability of the traffic analyzer 118 to analyze the mirrored traffic 117. In some cases, the amount of traffic that is mirrored may be set to a percentage less than 100% to enable the traffic analyzer 118 to keep up with the amount of mirrored traffic 117 being sent. If the traffic analyzer 118 detects anomalous behavior for a particular set of (one or more) services 112, then the mirrors 114 associated with the particular set of services may be configured to mirror and send additional traffic (e.g., up to 100% of the traffic) that is being sent to the particular set of services while the remaining services (e.g., not in the particular set of services) may have a smaller percentage (e.g., less than 100%) of traffic mirrored and sent to the traffic analyzer 118. Thus, in some cases the percentage of traffic that is mirrored and sent to the traffic analyzer 118 may be dynamically adjusted based on the analysis performed by the traffic analyzer 118, the amount of mirrored traffic 117, and the capabilities of the traffic analyzer 118. In most cases, the traffic analyzer 118 may create and configure each of the mirrors 114. However, in other cases, another container in the cluster 109 may create and configure each of the mirrors 114. In some cases, the traffic 116 and the mirrored traffic 117 may use Mutual Transport Layer Security (mTLS) to establish an encrypted TLS connection in which two parties use digital certificates to authenticate each other.

The traffic analyzer 118 may be configured to not respond to requests included in the mirrored traffic 117. The requests in the mirrored traffic 117 are mirrored as "fire and forget", such that any responses to the requests in the mirrored traffic 117 are discarded. The traffic analyzer 118 may receive the mirrored traffic 117 that includes a mirror of traffic being sent to each of the services 112 in the cluster 109 and perform an analysis of the mirrored traffic 117 to identify anomalous behavior. For example, the traffic analyzer 118 may use an artificial intelligence (AI) 119 that has been trained to identify anomalous behavior such as, for example, SQL injection, cookie poisoning, cross-site scripting, and other such behavior being performed by one of the services 112 in the cluster 109. In some cases, the traffic analyzer 118 may use automated scans 120 to automatically scan the mirrored traffic 117 to identify the anomalous behavior. The types of anomalous behavior that the traffic analyzer 118 looks for include, for example, broken access control, cryptographic failure (also known as sensitive data exposure), injection (including SQL injection), cross-site scripting, insecure design (e.g., software design flaws), security misconfiguration, including extended markup language (XML) external entities (XXE), vulnerable and outdated components (including using components with known vulnerabilities), identification and authentication failure (also known as broken authentication), software and data integrity failure (e.g., related to not verifying the integrity of software updates, critical data, CI/CD (continuous integration/continuous delivery) pipelines, and the like), security logging and monitoring failures, and server-side request forgery. The AI 119 may be implemented as a support vector machine (SVM), unsupervised clustering, such as k-means clustering, or artificial intelligence techniques, such as an artificial neural network, supervised learning, unsupervised learning, reinforcement learning, self-learning, or any combination thereof.

The AI 119 may be periodically retrained (e.g., every X days, X>0, such as X=30, 60, 90, or the like) using newly discovered threats and threat behaviors. In some cases, the automated scans 120 may include scans for threats discovered after the AI 119 was trained (e.g., re-trained). For example, assume the AI 119 is trained (using training data that includes potential threats and their associated behavior) on a first date. When a new threat is discovered, a particular scan for the newly discovered threat and associated behavior may be added to the automated scans 120. After X number of days have passed, the AI 119 may be retrained with training data that includes the newly discovered threat and the particular scan may be removed from the automated scans 120. In this way, the AI 119 may be used to identify a large percentage of threats and the automated scans 120 may include scans for newly discovered threats (and their behavior), e.g., threats discovered after the last time that the AI 119 was trained.

In response to detecting the anomalous behavior, the traffic analyzer 118 may perform one or more actions. For example, the traffic analyzer 118 may send a notification 122 to a recipient 124. In some cases, the recipient 124 may be a dashboard or another type of user interface (UI) that is viewed by authorized personnel, such as a system administrator. In other cases, the recipient 124 may be a system administrator and the notification 122 may be sent as an email, text message, Slack® message, or another type of notification. The actions performed by the traffic analyzer 118 may include creating a sandbox 124 around a particular service exhibiting the anomalous behavior, such as service 112(A), as illustrated in FIG. 1. The sandbox 124 may prevent outgoing (e.g., egress) traffic from exiting the particular service, thereby preventing the particular service (e.g., services 112(A)) from potentially performing inappropriate actions within or outside the cluster 109. In this way, the traffic analyzer 118 may (i) create the sandbox 124 to prevent the service 112 that is exhibiting anomalous behavior from doing additional harm and (ii) send the notification 122 to alert a system administrator to perform further investigation. Of course, the traffic analyzer 118 may perform other preventative and/or notification actions.

Thus, in a cluster with multiple services, a proxy associated with each service may be configured to mirror traffic being sent to each service (to create mirrored traffic) and send the mirrored traffic to a traffic analyzer. The traffic analyzer may use AI, automated scans, or both to determine whether the mirrored traffic appears normal or whether the mirrored traffic is indicative of anomalous behavior, such as, for example, SQL injection, cookie poisoning, cross-site scripting, or the like. If the traffic analyzer detects anomalous behavior, then the traffic analyzer may perform one or more actions, such as, for example, creating a sandbox around the service exhibiting the anomalous behavior to discard outgoing (egress) traffic from being sent to other services in the cluster, sending a notification indicating that the traffic analyzer has detected anomalous behavior being performed by a particular service, another type of action, or any combination thereof. In this way, a bad actor that is able to gain access to a cluster from within the cluster can be thwarted by using a traffic analyzer to analyze mirrored traffic in the cluster.

Figure 2:
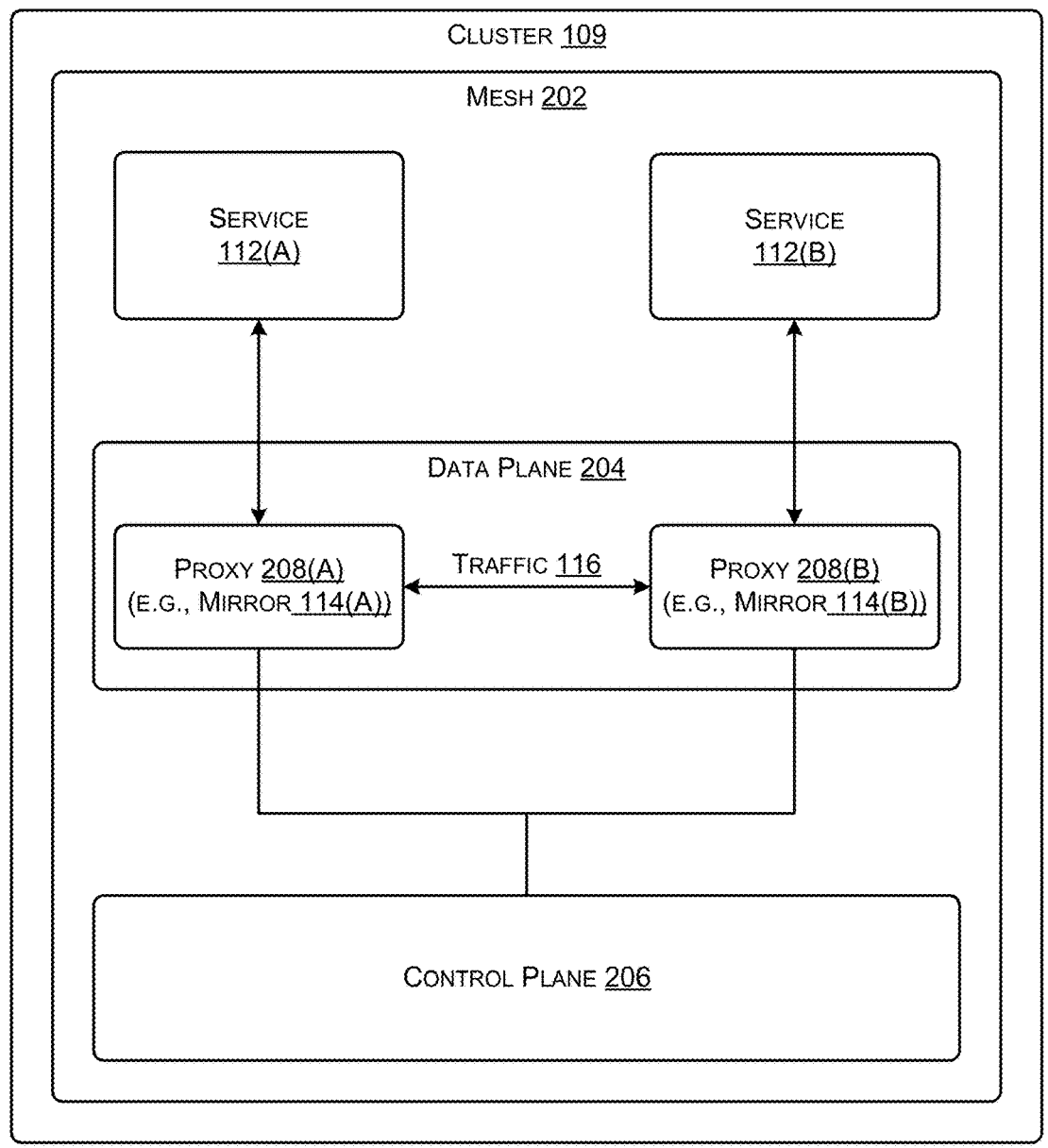
FIG. 2 is a block diagram of a system that includes a data plane, according to some embodiments.

FIG. 2 is a block diagram of a system 200 that includes a data plane, according to some embodiments. The cluster 109 may include a mesh 202 that has a data plane 204 and a control plane 206. For example, in some cases, the mesh 202 may be Istio. The data plane 204 may include a proxy service associated with each service in the cluster 109, such as a proxy 208(A) associated with service 112(A) and a proxy 208(B) associated with service 112(B). For example, in some cases, the proxy 208 may be an Envoy proxy. Each of the proxies 208 may be configured to mirror the traffic 116. For example, the proxy 208(A) may be configured to mirror traffic to create the mirror 114(A) and the proxy 208(B) may be configured to mirror traffic to create the mirror 114(B). Thus, a proxy in the data plane of a mesh may be configured to create a service to mirror traffic.

FIG. 3 is an example of code 300 to mirror traffic being sent to a microservice, according to some embodiments. The code 300 configures a proxy to mirror traffic having a destination of Service_A (e.g., service 112(A) of FIG. 1) and to send the mirrored traffic to Traffic_Analyzer (e.g., Traffic Analyzer 118 of FIG. 1). In this example, the mirrorPercentage is set to 100, configuring the mirror to send 100% of traffic with a destination of Service_A to the Traffic_Analyzer.

FIG. 4 is an example of code 400 to create a sandbox around a microservice by blocking traffic being sent by the microservice to other microservices, according to some embodiments. The code 400 sets an outbound traffic policy to prevent traffic from an application ("app") Service_A (e.g., service 112(A) of FIG. 1) to be sent, thereby blocking traffic being sent by an application exhibiting anomalous behavior. In this way, damage to recipients, within the cluster and outside the cluster, is prevented.

Figure 5:
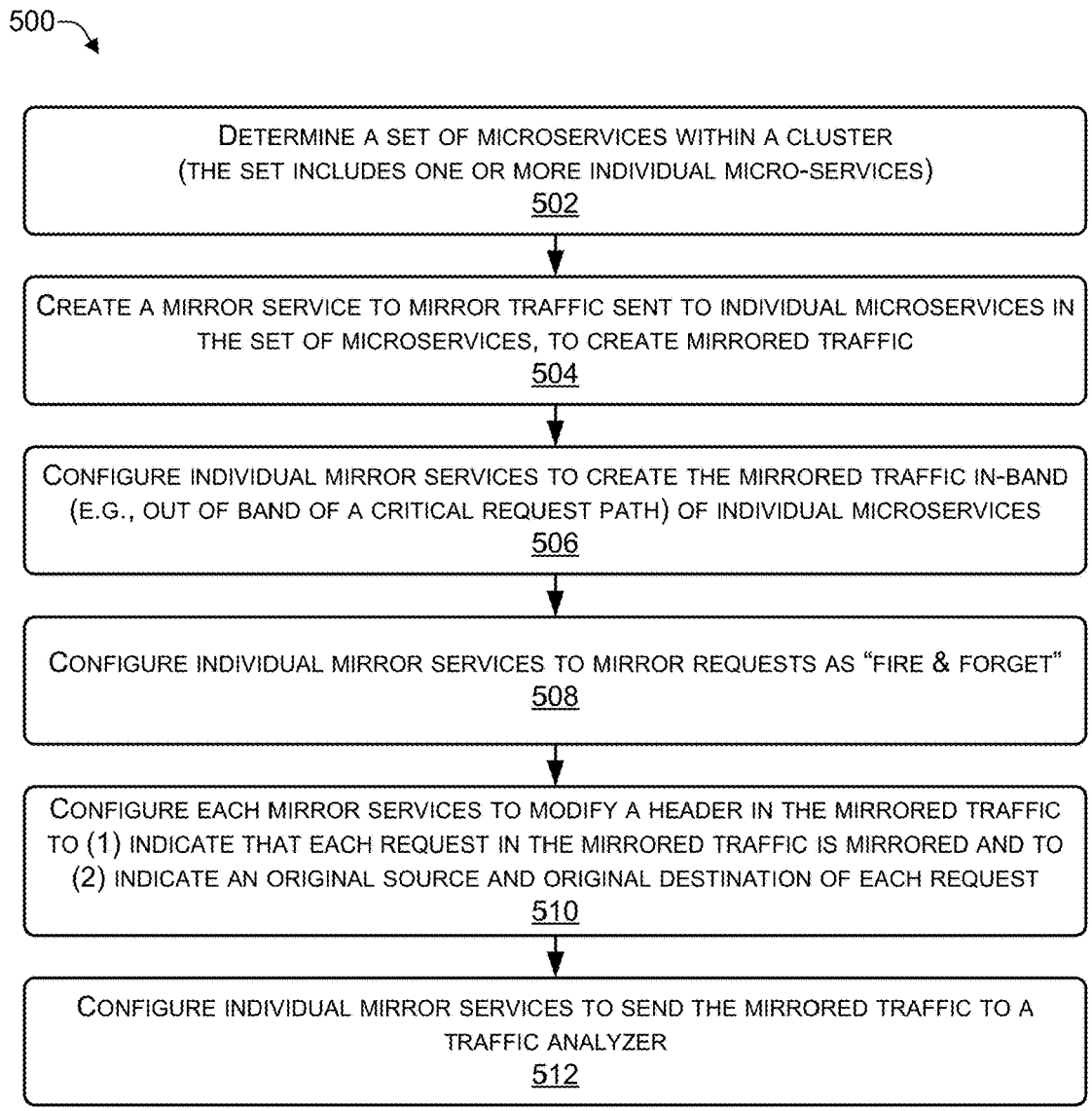
FIG. 5 is a flowchart of a process that includes creating a mirror service, according to some embodiments.
Figure 6:
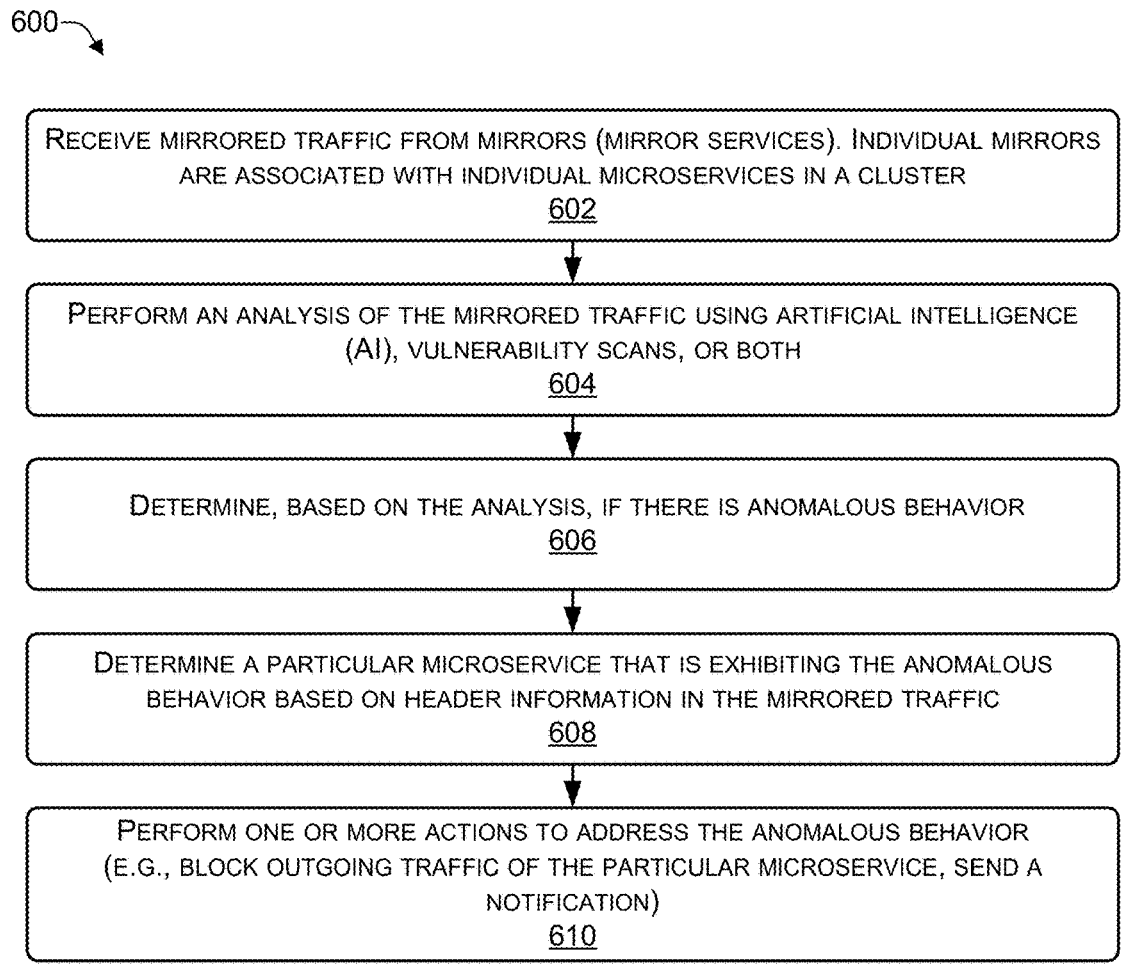
FIG. 6 is a flowchart of a process that includes performing an analysis of mirrored traffic, according to some embodiments.
Figure 7:
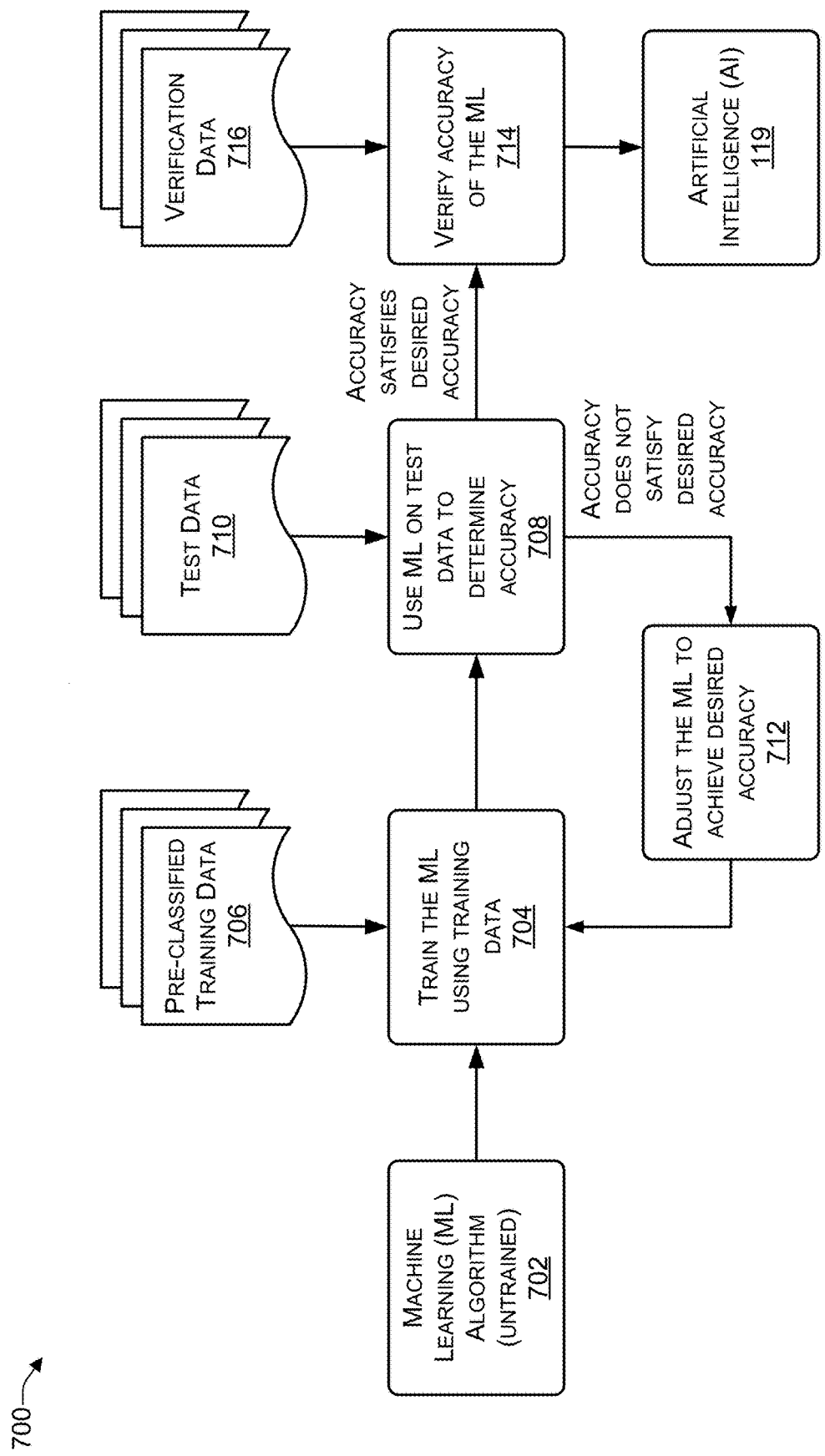
FIG. 7 is a flowchart of a process that includes training a machine learning algorithm to create an artificial intelligence (AI), according to some embodiments.

In the flow diagrams of FIGS. 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, and 700 are described with reference to FIGS. 1, 2, 3, and 4 as described above, although other models, frameworks, systems and environments may be used to implement these processes.

FIG. 5 is a flowchart of a process 500 that includes creating a mirror service, according to some embodiments. The process 500 may be performed by a container in the cluster 109, such as the traffic analyzer 118 of FIG. 1.

At 502, the process may determine a set of microservices within a cluster, where the set includes one or more individual micro services. At 504, the process may create a mirror service (for each microservice) to mirror traffic sent to individual micro services in the set of micro services to create mirrored traffic. For example, in FIG. 1, the process may identify the services 112 located in the cluster 109 and create the mirrors 114 (e.g., using Envoy proxy service in Istio) to mirror the traffic 116 being sent to each of the services 112. Each of the mirrors 114 may mirror the traffic 116 to create the mirrored traffic 117. For example, the mirrors may be created using code similar to the code shown in FIG. 3.

At 506, the process may configure individual mirror services to create the mirrored traffic in-band (but out-of-band of a critical request path) of individual micro services. At 508, the process may configure individual micro services to mirror requests as "fire and forget" (e.g., such that the recipient of the mirrored traffic does not send a response and/or any response sent by the recipient is ignored). For example, in FIG. 1, the process may configure the mirror services 114 to create the mirrored traffic 117 of at least a portion of traffic being sent to each of the services 112. Requests in the mirrored traffic 117 may be sent as "fire and forget" where any responses to the requests in the mirrored traffic 117 are ignored.

At 510, the process may configure each mirror service to modify a header in the mirrored traffic (1) to indicate that each request in the mirrored traffic is a mirrored request and (2) to indicate an original source and an original destination of each request. At 512, the process may configure individual mirror services to send the mirrored traffic to a traffic analyzer. For example, in FIG. 1, the process may modify the header 132 of the mirrored traffic 117 to include a mirroring indicator 134 that indicates that the traffic 117 is mirrored traffic. The process may modify the header 132 of the mirrored traffic 117 to indicate an original source 136 and an original destination 138. For example, if the service 112(A) sends a request to the service 112(B), then the mirror 114(B) modifies a header of the mirrored traffic 117(B) to indicate (1) that the traffic 117(B) is mirrored traffic, (2) the original source 136 is the service 112(A), and (3) the original destination 138 is the service 112(B). The mirrors 114 may be configured to send the mirrored traffic 117 to the traffic analyzer 118. In this way, the traffic analyzer 118 is able to identify anomalous behavior and the source of the anomalous behavior.

Thus, in a cluster with multiple services (e.g., microservices), each service may be provided with a mirror (e.g., configured using an Envoy proxy in Istio). Each mirror may be configured to mirror requests in at least a portion of the traffic sent to each of the services in the cluster. The mirrored traffic may be created in-band for each service and requests in the mirrored traffic may be sent as "fire and forget". The header of the mirrored traffic may be modified to indicate that the traffic is mirrored, thereby preventing the recipient from responding to requests in the mirrored traffic. The header of the mirrored traffic may be modified to indicate an original source and an original destination of the traffic that being mirrored. For example, the traffic analyzer may determine that an abnormally large number of requests are being sent to a particular service. If the traffic analyzer determines that the same source sent the abnormally large number of requests to the particular service, then the traffic analyzer may determine that the source service is exhibiting anomalous behavior.

FIG. 6 is a flowchart of a process 600 that includes performing an analysis of mirrored traffic, according to some embodiments. The process 600 may be performed by a container in the cluster 109, such as the traffic analyzer 118 of FIG. 1.

At 602, the process may receive mirrored traffic from mirrors, where individual mirrors are associated with individual microservices in the cluster. At 604, the process may perform an analysis of the mirrored traffic using artificial intelligence, vulnerability scans, or a combination of both. At 606, the process may determine, based on the analysis, if there is anomalous behavior. For example, in FIG. 1, the traffic analyzer 118 may receive the mirrored traffic 117 from the mirrors 114 that are associated with the services 112 in the cluster 109. Each of the services 112 may have an associated mirror 114 To mirror traffic being sent to each service 112. The traffic analyzer 118 may use the AI 119, the automated scans 120, or a combination of both to analyze the mirrored traffic 117 to determine whether there is anomalous behavior in the cluster 109.

At 608, the process may determine a particular microservice that is exhibiting the anomalous behavior based on header information in the mirrored traffic. For example, in FIG. 1, the traffic analyzer 118 may look at the header 132 to identify the original source 136 and the original destination 138 to make a determination as to which of the services 112 is exhibiting the anomalous behavior. To illustrate, in some cases, a particular one of the services 112 that is sending an amount of messages (e.g., malicious requests) that is above normal (e.g., above average, above a predetermined threshold, or the like) may be identified as exhibiting anomalous behavior. In other cases, a particular one of the services 112 that is receiving an amount of messages (e.g., in response to requests for confidential data or the like) that is above normal (e.g., above average, above a predetermined threshold, or the like) may be identified as exhibiting anomalous behavior.

At 610, the process may perform one or more actions to address the anomalous behavior. For example, the one or more actions may include blocking outgoing (egress) traffic of the particular microservice, sending a notification (e.g., indicating anomalous behavior was detected), another action, or any combination thereof. For example, in FIG. 1, the traffic analyzer 118 may perform one or more actions. To illustrate, assume that the traffic analyzer 118 determines that the service 112(A) is exhibiting anomalous behavior. In such cases, the traffic analyzer 118 may create the sandbox 124 to stop outgoing messages (e.g., limit egress), send the notification 122 to the recipient 124, perform another action, or any combination thereof. For example, the sandbox 124 may be created using code similar to the code shown in FIG. 4.

FIG. 7 is a flowchart of a process 700 that includes training a machine learning algorithm to create an artificial intelligence (AI), according to some embodiments. For example, the process 700 may be performed by the server 104 of FIG. 1 to create the AI 119.

At 702, a machine learning algorithm (e.g., software code that has not yet been trained) may be created by one or more software designers. At 704, the machine learning algorithm may be trained using pre-classified training data 706 (e.g., vulnerabilities and attributes of vulnerabilities). For example, the training data 706 may have been pre-classified by humans, by machine learning, or a combination of both. After the machine learning has been trained using the pre-classified training data 706, the machine learning may be tested, at 708, using test data 710 to determine an accuracy of the machine learning. For example, in the case of a classifier, the accuracy of the classification may be determined using the test data 710.

If an accuracy of the machine learning does not satisfy a desired accuracy (e.g., 95%, 98%, 99% accurate), at 708, then the machine learning code may be modified (e.g., adjusted), at 712, to achieve the desired accuracy. For example, at 712, the software designers may modify the machine learning software code to improve the accuracy of the machine learning algorithm. After the machine learning has been tuned, at 712, the machine learning may be retrained, at 704, using the pre-classified training data 706. In this way, 704, 708, 712 may be repeated until the machine learning is able to classify the test data 710 with the desired accuracy.

After determining, at 708, that an accuracy of the machine learning satisfies the desired accuracy, the process may proceed to 714, where verification data 716 may be used to verify an accuracy of the machine learning. After the accuracy of the machine learning is verified, at 714, the artificial intelligence 119, which has been trained to provide a particular level of accuracy may be used. For example, the AI 119 may be trained to detect anomalous behavior in mirrored traffic.

Figure 8:
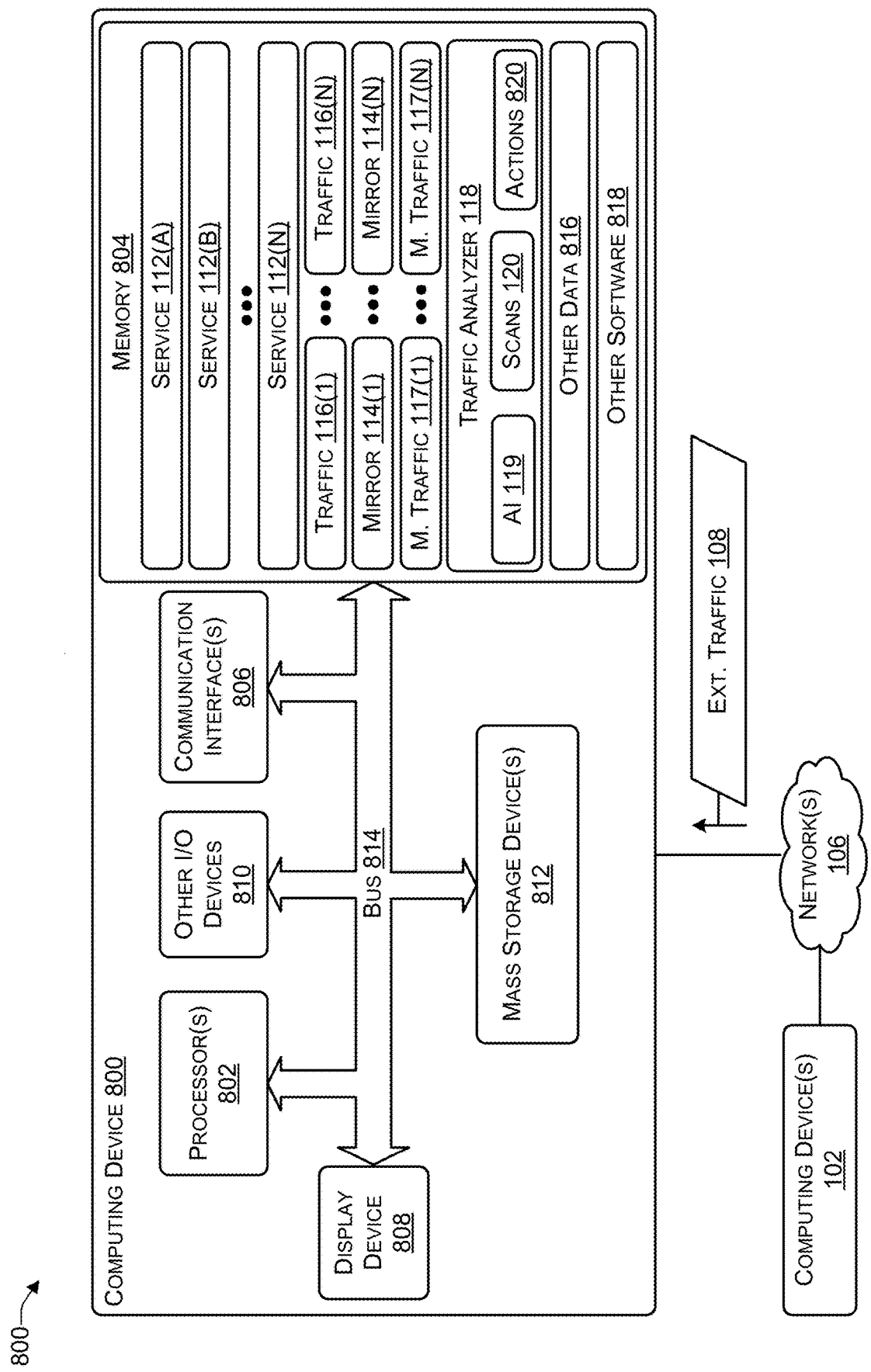
FIG. 8 illustrates an example configuration of a computing device that can be used to implement the systems and techniques described herein.

FIG. 8 illustrates an example configuration of a computing device 800 that can be used to implement the systems and techniques described herein, such as the server 104 of FIG. 1.

The computing device 800 may include one or more processors 802 (e.g., central processing unit (CPU), graphics processing unit (GPU), or the like), a memory 804, communication interfaces 806, a display device 808, other input/output (I/O) devices 810 (e.g., keyboard, trackball, and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 802 are one or more hardware devices that may include a single processing unit or multiple processing units, all of which may include single or multiple computing units or multiple cores. The processors 802 may include a GPU that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 are configured to fetch and execute computer-readable instructions stored in the memory 804, mass storage devices 812, and other types of non-transitory computer-readable media.

Memory 804 and mass storage devices 812 are examples of non-transitory computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 804 and mass storage devices 812 may be collectively referred to as memory or computer storage media herein and include any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via the network(s) 106. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 804 and mass storage devices 812, may be used to store software and data. For example, the computer storage media may be used to store N (N>0) services 112 (e.g., service 112(A), 112(B), to 112(N). Each service may receive corresponding traffic. For example, service 112(A) (e.g., first service) may receive traffic 116(A) and service 112(N) may receive traffic 116(N). Each service 112 may have an associated mirror 114. For example, service 112(A) may have an associated mirror 114(A) to create mirrored traffic 117(1) and service 112(N) may have an associated mirror 114(N) to create mirrored traffic 117(N). The mirrored traffic 117 is analyzed by the traffic analyzer 118 using the AI 119, the automated scans 120, or both. If the traffic analyzer 118 detects anomalous behavior, then the traffic analyzer 118 may perform one or more actions 820 (e.g., such as creating the sandbox 124, sending the notification 122, another one of the actions 820, or any combination thereof). The computer storage media may be include other data 816 and other software 818.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by one or more processors, a plurality of microservices comprising at least a first microservice and a second microservice that are in a cluster;
    creating, by the one or more processors, a first mirror service to mirror first traffic sent to the first microservice;
    creating, by the one or more processors, a second mirror service to mirror second traffic sent to the second microservice;
    configuring, by the one or more processors, the first mirror service and the second mirror service to create, based on the first traffic and the second traffic, mirrored traffic that is created out-of-band of a critical request path of the first microservice and of the second microservice;
    configuring, by the one or more processors, the first mirror service and the second mirror service to modify a header of a mirrored request in the mirrored traffic to indicate:
        the mirrored request in the mirrored traffic is a mirrored copy of a request;
        an original source of the request; and
        an original destination of the request; and configuring, by the one or more processors, the first mirror service and the second mirror service to send the mirrored traffic to a traffic analyzer, the traffic analyzer performing an analysis of the mirrored traffic to identify an anomalous behavior of an offending microservice operating in the cluster, the traffic analyzer using artificial intelligence algorithm, automated vulnerability scans, or both to perform the analysis.

2. The method of claim 1, further comprising:
after identifying the anomalous behavior of the offending microservice:
blocking outgoing traffic originating from the offending microservice;
sending a notification indicating that the offending microservice is exhibiting anomalous behavior; or
any combination thereof.

3. The method of claim 1, wherein:
the first microservice and the second microservice each use mutual Transport Layer Security (mTLS) to establish an encrypted transport layer security connection in which:
the first microservice uses a first digital certificate to authenticate the second microservice; and
the second microservice uses a second digital certificate to authenticate the first microservice.

4. The method of claim 1, further comprising:
configuring the first mirror service and the second mirror service to mirror a request included in either the first traffic or the second traffic as a type of request to which the traffic analyzer is not to respond.

5. The method of claim 1, further comprising:
configuring a first proxy in a data plane of the cluster to create the first mirror service; and
configuring a second proxy in the data plane of the cluster to create the second mirror service.

6. The method of claim 1, wherein the artificial intelligence algorithm comprises one of:
a support vector machine;
an unsupervised clustering algorithm; or
an artificial neural network algorithm.

7. The method of claim 1, wherein:
the artificial intelligence algorithm is trained using:
a plurality of vulnerabilities; and
one or more attributes associated with individual vulnerabilities of plurality of vulnerabilities.

8. A server comprising:
one or more processors; and
one or more non-transitory computer readable media storing instructions executable by the one or more processors to perform operations comprising:
determining a plurality of microservices comprising at least a first microservice and a second microservice that are in a cluster;
creating a first mirror service to mirror first traffic sent to the first microservice;
creating a second mirror service to mirror second traffic sent to the second microservice;
configuring the first mirror service and the second mirror service to create, based on the first traffic and the second traffic, mirrored traffic that is created out-of-band of a critical request path of the first microservice and of the second microservice;
configuring the first mirror service and the second mirror service to modify a header of a mirrored request in the mirrored traffic to indicate:
the mirrored request in the mirrored traffic is a mirrored copy of a request;
an original source of the request; and
an original destination of the request; and
configuring the first mirror service and the second mirror service to send the mirrored traffic to a traffic analyzer, the traffic analyzer performing an analysis of the mirrored traffic to identify an anomalous behavior of an offending microservice operating in the cluster, the traffic analyzer using an artificial intelligence algorithm, automated vulnerability scans, or both to perform the analysis.

9. The server of claim 8, the operations further comprising:
creating a sandbox around the offending microservice to block outgoing traffic after identifying the anomalous behavior of the offending microservice.

10. The server of claim 8, the operations further comprising:
sending a notification message to a recipient indicating that the offending microservice is exhibiting anomalous behavior, the recipient comprising a dashboard associated with the cluster, a system administrator, or both.

11. The server of claim 8, the operations further comprising:
establishing an encrypted transport layer security connection in which:
the first microservice uses a first digital certificate to authenticate the second microservice; and
the second microservice uses a second digital certificate to authenticate the first microservice.

12. The server of claim 8, the operations further comprising:
configuring the first mirror service and the second mirror service to mirror a request included in either the first traffic or the second traffic as a type of request to which the traffic analyzer is not to respond.

13. The server of claim 8, the operations further comprising:
configuring a first proxy in a data plane of the cluster to create the first mirror service; and
configuring a second proxy in the data plane of the cluster to create the second mirror service.

14. The server of claim 8, wherein:
the artificial intelligence algorithm comprises one of:
a support vector machine;
an unsupervised clustering algorithm; or
an artificial neural network algorithm; and
the artificial intelligence algorithm is trained using:
a plurality of vulnerabilities; and
one or more attributes associated with individual vulnerabilities of plurality of vulnerabilities.

15. One or more non-transitory computer readable media storing instructions executable by one or more processors to perform operations comprising:
determining a plurality of microservices comprising at least a first microservice and a second microservice that are in a cluster;
creating a first mirror service to mirror first traffic sent to the first microservice;
creating a second mirror service to mirror second traffic sent to the second microservice;
configuring the first mirror service and the second mirror service to create, based on the first traffic and the second traffic, mirrored traffic that is created out-of-band of a critical request path of the first microservice and of the second microservice;

configuring the first mirror service and the second mirror service to modify a header of a mirrored request in the mirrored traffic to indicate:
  the mirrored request in the mirrored traffic is a mirrored copy of a request;
  an original source of the request; and
  an original destination of the request; and
configuring the first mirror service and the second mirror service to send the mirrored traffic to a traffic analyzer, the traffic analyzer performing an analysis of the mirrored traffic to identify an anomalous behavior of an offending microservice operating in the cluster, the traffic analyzer using an artificial intelligence algorithm, automated vulnerability scans, or both to perform the analysis.

16. The one or more non-transitory computer readable media of claim 15, the operations further comprising:
  creating a sandbox around the offending microservice to block outgoing traffic based at least in part on identifying the anomalous behavior of the offending microservice.

17. The one or more non-transitory computer readable media of claim 15, the operations further comprising:
  configuring the first mirror service to mirror up to one hundred percent of the first traffic being sent to the first microservice; and
  configuring the second mirror service to mirror up to one hundred percent of the second traffic being sent to the second microservice.

18. The one or more non-transitory computer readable media of claim 15, the operations further comprising:
  establishing an encrypted transport layer security connection in which:
    the first microservice uses a first digital certificate to authenticate the second microservice; and
    the second microservice uses a second digital certificate to authenticate the first microservice.

19. The one or more non-transitory computer readable media of claim 15, the operations further comprising:
  configuring the first mirror service and the second mirror service to mirror a request included in either the first traffic or the second traffic as a type of request to which the traffic analyzer is not to respond.

20. The one or more non-transitory computer readable media of claim 15, the operations further comprising:
  configuring a first proxy in a data plane of the cluster to create the first mirror service; and
  configuring a second proxy in the data plane of the cluster to create the second mirror service.

* * * * *